United States Patent [19]

Overton

[11] Patent Number: 4,481,815
[45] Date of Patent: Nov. 13, 1984

[54] TACTILE SENSOR

[76] Inventor: Kenneth J. Overton, 15 Acrebrook Dr., Chicopee, Mass. 01020

[21] Appl. No.: 452,792

[22] Filed: Dec. 23, 1982

[51] Int. Cl.$^3$ .................. G01D 7/02; H01C 10/10
[52] U.S. Cl. ..................... 73/432 R; 73/862.04; 73/865; 338/114; 338/47; 901/44
[58] Field of Search ............... 73/172, 432 G, 432 R, 73/862.04, 862.68; 338/47, 99, 114; 340/365 A; 901/33, 44

[56] References Cited

U.S. PATENT DOCUMENTS

| Re. 29,765 | 9/1978 | Crane et al. ................. 73/432 R |
| 355,858 | 1/1887 | Brainard . |
| 2,528,086 | 10/1950 | Schenck ....................... 200/166 |
| 2,843,695 | 7/1958 | Osuch et al. .................. 200/86 |
| 3,054,879 | 9/1962 | Soreng ......................... 200/159 |
| 3,056,005 | 9/1962 | Larson ......................... 200/86 |
| 3,267,233 | 9/1966 | Basile et al. ................... 200/83 |
| 3,308,253 | 3/1967 | Krakinowski ................. 200/46 |
| 3,359,386 | 12/1967 | Howard ........................ 200/83 |
| 3,382,338 | 5/1968 | Arsenault et al. ............. 200/159 |
| 3,466,410 | 9/1969 | Jordan et al. ................. 200/83 |
| 3,503,031 | 3/1970 | Nyhus et al. ................. 338/99 |
| 3,930,412 | 1/1976 | Mallon et al. ................ 73/398 |
| 3,948,093 | 4/1976 | Folchi et al. ................. 73/133 R |
| 4,001,556 | 1/1977 | Folchi et al. ................. 235/151 |
| 4,014,217 | 3/1977 | Lagasse et al. .............. 338/114 X |
| 4,067,945 | 1/1978 | DuRocher .................... 338/114 X |
| 4,142,175 | 2/1979 | Herbst et al. ................ 340/146.3 SY |
| 4,156,911 | 5/1979 | Crane et al. .................. 364/419 |
| 4,190,785 | 2/1980 | Kompaneck .................. 310/330 |
| 4,240,065 | 12/1980 | Howbrook ................... 340/146.3 SY |
| 4,243,923 | 1/1981 | Whitney et al. .............. 318/561 |
| 4,300,395 | 11/1981 | Shirouzu et al. .............. 73/708 |
| 4,309,907 | 1/1982 | Budraitis et al. .............. 73/771 |
| 4,317,011 | 2/1982 | Mazurk ........................ 200/5 A |
| 4,317,013 | 2/1982 | Larson ......................... 200/5 A |
| 4,319,078 | 3/1982 | Yokoo et al. ................. 178/18 |
| 4,322,980 | 4/1982 | Suzuki et al. ................. 73/727 |
| 4,347,505 | 8/1982 | Anderson .................... 338/47 X |

FOREIGN PATENT DOCUMENTS 1060455 7/1959 Fed. Rep. of Germany .
807883 1/1959 United Kingdom .

OTHER PUBLICATIONS

M. Briot, "The Utilization of an 'Artificial Skin' Sensor for the Identification of Solid Objects," pp. 529-547.
Leon D. Harmon, "Touching-Sensing Technology: A Review," Industrial Robots, vol. 1/Fundamentals Second Edition 1981, pp. 375-400.
Page et al., "Novel Techniques for Tactile Sensing in a Three-Dimensional Environment," 3rd Conference on Industrial Robot Technology & 6th International Symposium on Industrial Robots, Mar. 24-26, 1976, pp. C3-33 to C3-46.
William Daniel Hillis, "Active Touch Sensing," Massachusetts Institute of Technology Artificial Intelligence Laboratory, Apr. 1981, A.I. Memo 629, pp. 1-37.
Kenneth J. Overton and Thomas Williams, "Tactile Sensation for Robots," Supported in part by NIH Grant NS 14971-03 and Digital Equipment Corporation, (Michael A. Arbib, Principal Investigator), pp. 791-795.

Primary Examiner—Charles A. Ruehl

[57] ABSTRACT

A tactile sensor in which the sensor elements are discrete, elastomeric, electrically conductive, electrically force-sensitive forcel units electrically insulated from one another, each forcel unit defining a local force-resolution region (forcel) for resolving a deflection pattern in the surface of the sensor, each sensor element being connected between a pair of electrical channels which produce a set of signals representative of the deflection pattern in the surface; a sensing system for determining a parameter of an object being contacted by the tactile sensor; and a method of fabricating the sensor.

20 Claims, 14 Drawing Figures

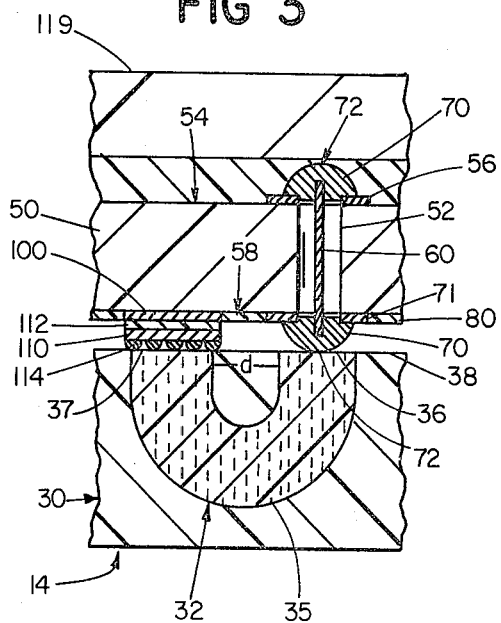
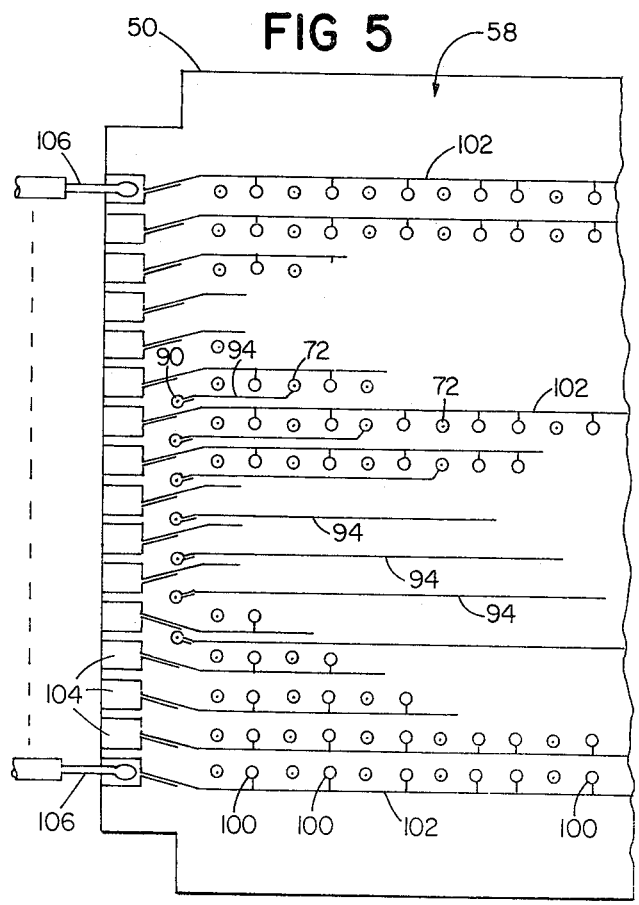
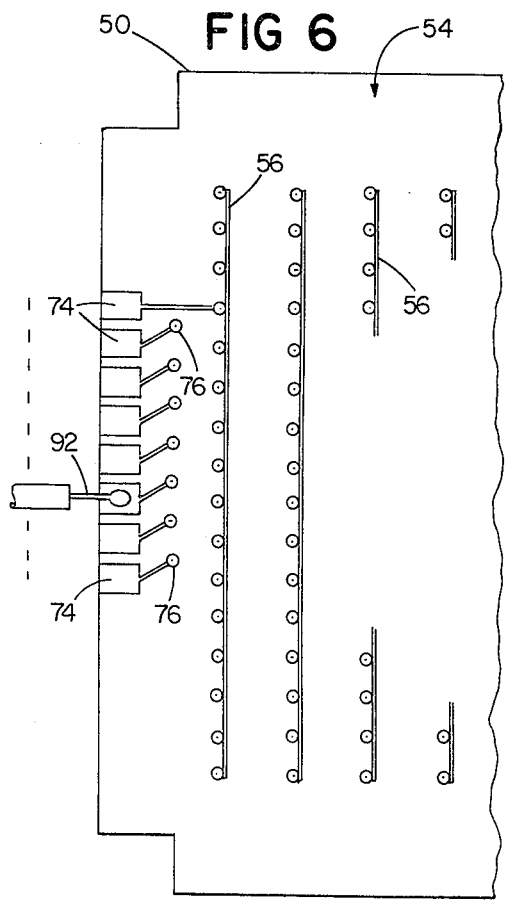

TACTILE SENSOR

BACKGROUND OF THE INVENTION

This invention relates to tactile sensors for sensing an object based on detecting the deflection pattern in a sensor surface caused by contact of the surface with the object.

Typical tactile sensors have force-sensitive deflection-responsive sensor members associated with the sensor surface and electrical circuitry which connects the members to an analyzer for determining a physical parameter (e.g., shape, size, location or orientation) of the object being sensed. The analyzer makes a bi-level determination of whether a member is or is not subject to a force. Such tactile sensors are expensive to make, require complex sensing circuits, and have operational deficiencies.

SUMMARY OF THE INVENTION

In general, in one aspect, the invention features the improvement in which the sensor elements include an array of discrete, elastomeric, electrically conductive, electrically force-sensitive forcel units electrically insulated from one another, each forcel unit defining a local force-resolution region (forcel) for the resolution of the deflection pattern in the surface, and the circuitry has a plurality of electrical channels, each sensor element being connected between a pair of the channels, the channels being adapted to be electrically sensed to produce a set of signals representative of the deflection pattern in the surface.

In preferred embodiments, each forcel unit has a pair of electrical connecting portions and an intermediate body portion extending between the connecting portions and positioned with respect to the sensor surface to be deflected by the object, the electrical path of the forcel unit extending from one of the connecting portions through the intermediate body portion to the other connecting portion; each forcel unit has an elongated segment the ends of which have the pair of connecting portions, and the segment is bent with the ends disposed along a common electrical interface surface, and with an intermediate part of the segment disposed toward the sensor surface; the segment is a u-shaped cord; there is a circuit board which has a contact surface carrying the channels, the channels being exposed for making electrical contact, and the contact surface is disposed against the interface surface with the ends contacting the channels; each channel is connected to more than one forcel unit, and the circuitry includes unidirectional current flow means for limiting the direction of flow of current in the circuitry to enable discrimination between different forcel units; the unidirectional current flow means has individual diode-like elements each electrically connected between one forcel unit and one channel, the diode-like elements preventing multiple electrical paths from contributing to a given signal, whereby the deflection of each forcel unit may be individually sensed without electrical cross-talk from simultaneously deflected adjacent forcel units; the channels are arranged in columns and rows for resolving the sensor surface into a grid of the forcel units, and the channels are adapted for sequentially reading current flowing through individual columns and rows; there is a voltage source for powering a succession of individual columns, and means for grounding at least some of the columns other than the column which is powered, and the circuitry has means for sensing a succession of individual rows while each column is powered, to produce a set of signals each indicative of the deflection of one of the forcel units; the forcel units are embedded in an elastomeric, insulative supportive matrix substance; each forcel unit is mechanically coupled with at least one other forcel unit, whereby a force imposed on one forcel unit produces a deflection in the other forcel unit; there are groups of the forcel units each group associated with one of the local force-resolution regions, the relative levels of the signals between forcel units in each group being indicative of both the direction and the magnitude of the force at the associated local force-resolution region; the characteristics of the electrical paths vary proportionally with the forces at the local force-resolution regions; one characteristic of each electrical path is resistance, and each forcel unit comprises a carbon doped elastomer.

In another aspect, the invention features a sensing system for determining a physical parameter of an object based on contacting the object being sensed, having (1) a tactile sensor with a sensor surface arranged for contact with and deflection by the object, means for producing sets of signals representative of the pattern of the deflection at an array of force-resolution regions (forcels) of the surface, and an array of discrete, elastomeric, electrically conductive, electrically force-sensitive forcel units each associated with a forcel, (2) a positioner for causing contact between the object and the sensor surface, and (3) analysis circuitry for determining the physical parameter based on the signals, having data accumulation means for deriving and storing the sets of signals from the tactile sensor, and data processing means for manipulating the stored signals in accordance with a predetermined program of steps and generating information indicative of the parameter.

In preferred embodiments, the object includes a workpiece, and the positioner includes a manipulandum of a robot; and the parameter is the shape, size, or location of the object, or the direction in which the contact is made.

In another aspect, the invention features a method of fabricating a tactile sensor having an array of the forcel units electrically insulated from one another, the method having the steps of arranging the forcel units in a grid within a space defined by a casting mold, and casting a volume of an elastomeric, insulative matrix substance within the mold, with the matrix substance enveloping the forcel units entirely except for electrical connecting portions of each unit.

In preferred embodiments, the electrical connecting portions are exposed at an electrical connecting interface surface of the cast matrix substance, and the method has the step of attaching the interface surface to a contact surface of a circuit board; each forcel unit has a pair of the electrical connecting portions, and the method includes before the attaching step, the step of positioning a diode-like device adjacent one electrical connecting portion of each element with one electrode of the device in contact with that connecting portion and the other electrode of the device disposed for contact with the contact surface.

Accurate determinations can be made of the sizes of the forces within a broad range occurring over the surface of the object, the force determination at each resolution point being electrically independent of the force at the other points, enabling the use of simple circuitry; and the resulting image of forces can be analyzed to indicate the size, position, shape or orientation (or other parameter) of the object.

Other advantages and features of the invention will be apparent from the following description of the preferred embodiment and from the claims.

DESCRIPTION OF THE PREFERRED EMBODIMENT

We first briefly describe the drawings.

Drawings

FIG. 3 is a sectional view, not to scale, partially broken away, of a sensor unit.

FIGS. 5 and 6 are top and bottom views, respectively, of a printed circuit board portion of the sensor unit.

Structure

Figure 1:
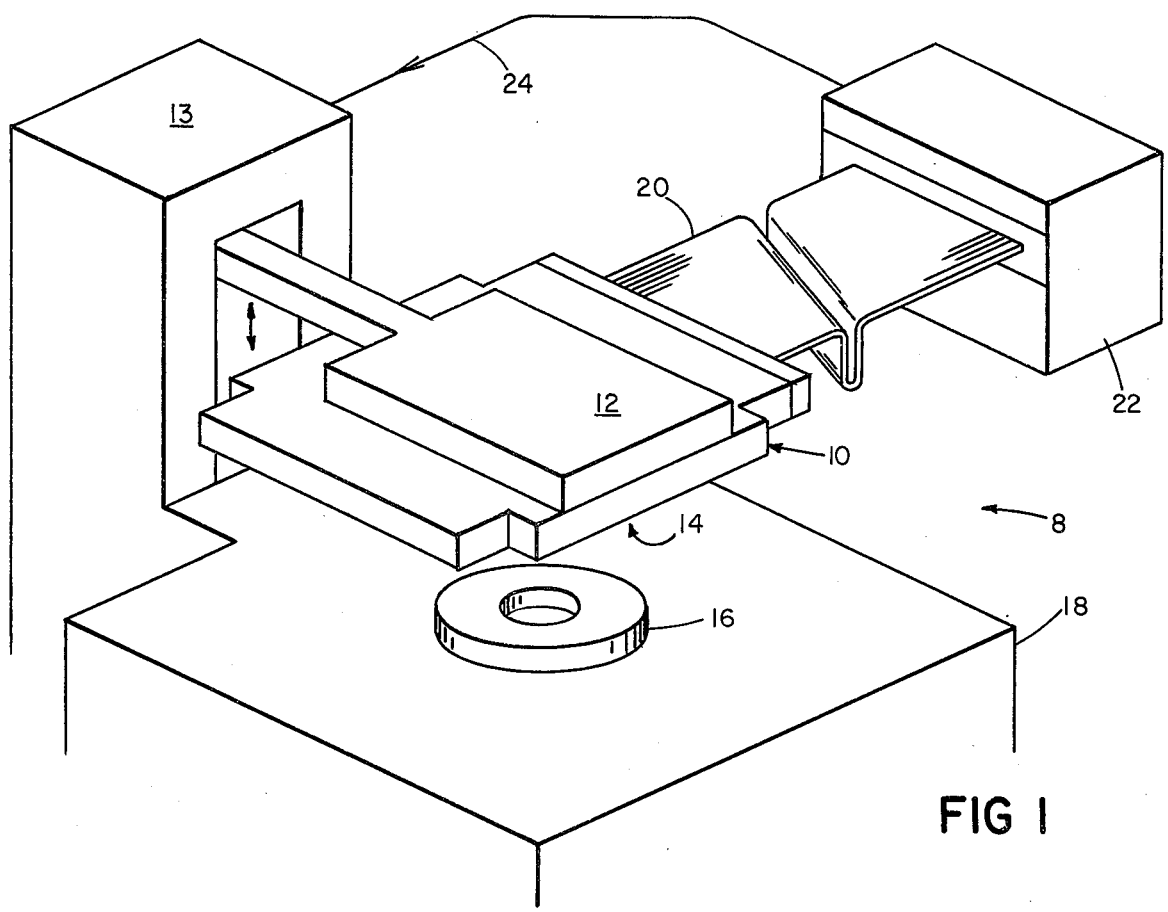
FIG. 1 is a diagrammatic view of a tactile sensor system with an object to be sensed.

Referring to FIG. 1, tactile sensor 8 has sensor unit 10 supported on movable arm (e.g., a robot manipulandum) 12 which can be manipulated (by positioner 13) to cause a sensor surface 14 of sensor unit 10 to contact and conform to an exposed surface of an object 16 (e.g., a metal ring workpiece) supported on a work table 18. Positioner 13 establishes reactive forces which form a deflection pattern at an array of local force-resolution regions (forcels) on sensor surface 14. The sizes and directions of the forces depend on the size, shape, location, and orientation of object 16 and the position and direction of motion of positioner 13. Sensor unit 10 is electrically connected by 24-wire cable 20 to analysis circuitry 22, which provides signals to and analyses information sensed from sensor unit 10, and delivers control signals over line 24 to positioner 13.

Figure 2:
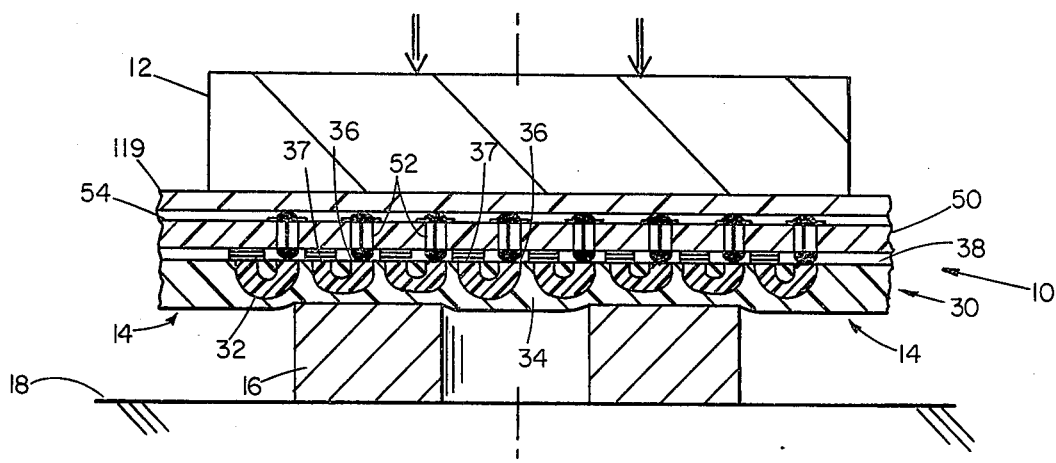
FIG. 2 is a sectional view, partially broken away, of a sensor unit.

Referring to FIG. 2, sensor unit 10 has a sensing layer 30 having an array of 128 discrete, electrically conductive, electrically force-sensitive forcel units 32 of 0.035" diameter carbon-doped silicone rubber cord (SC-Consil type available from Teknit, Cranford, N.J.) (arranged in a grid of sixteen rows at 1/16" intervals and eight columns at ⅛" intervals). The forcel units are embedded in a supporting matrix 34 of elastomeric insulative silicone rubber (Type RTV 11 available from General Electric Company), with the two ends (electrical connecting portions) 36, 37 of each forcel unit 32 exposed at an electrical interface surface 38 of layer 30 opposite sensor surface 14. Thus, each forcel unit 32 is electrically insulated from, and mechanically coupled, by matrix 34 with its neighboring forcel units 32.

Referring to FIG. 3, each forcel unit 32 is bent in a u-shape with the intermediate body portion (segment) 35 of the "u" positioned close to (but not exposed at) surface 14. Thus each forcel unit defines an electrical path from one end through the intermediate body portion to the other end. Dimension d is approximately 0.020".

Figure 4:
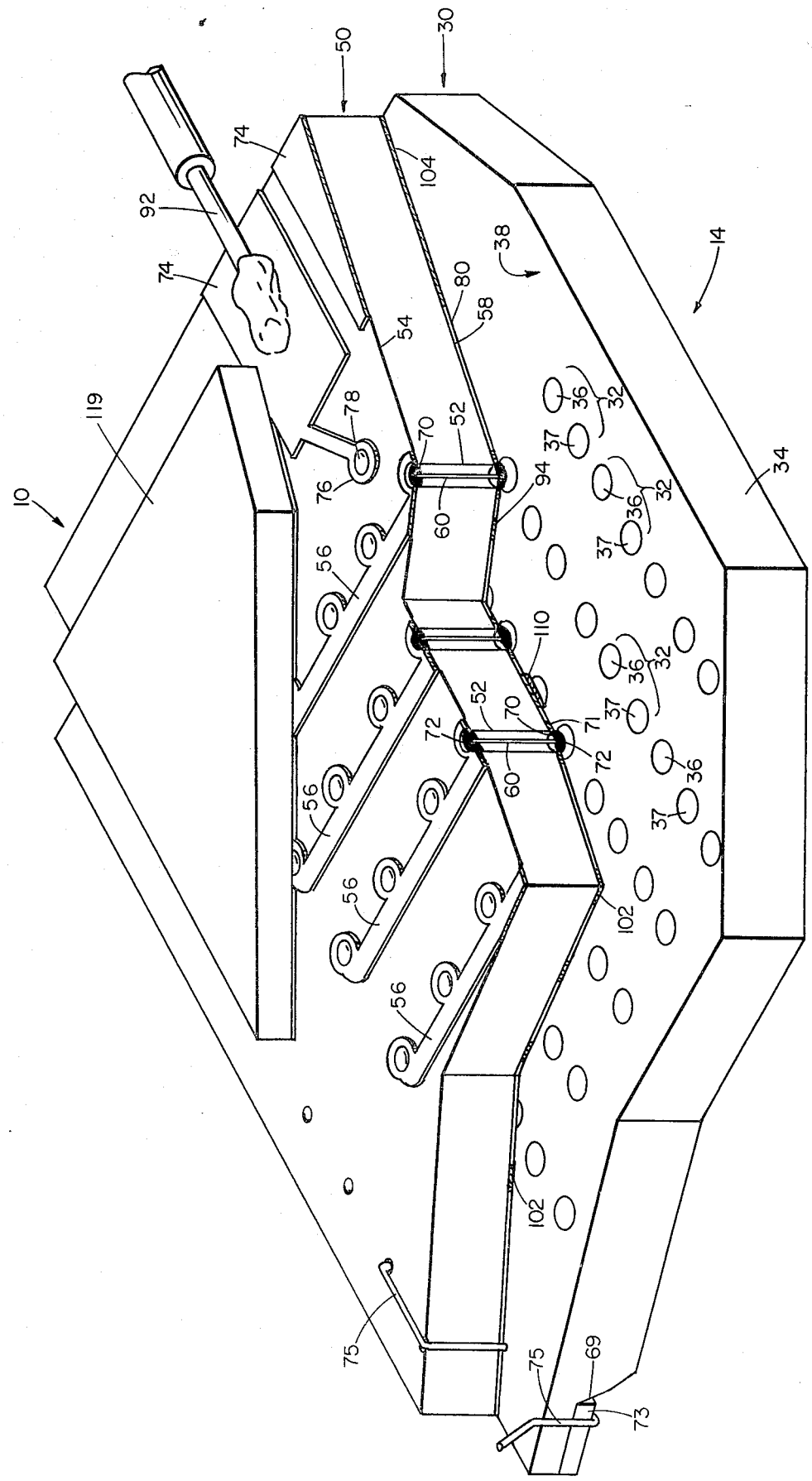
FIG. 4 is an isometric view, partially broken away, of a sensor unit.

Referring to FIGS. 4, 5, 6, a grid (eight columns and sixteen rows) of holes 52 (each 0.0135" in diameter) through a printed circuit board 50 occupy positions corresponding to the locations of the ends 36 of forcel units 32.

The opposite side 54 of board 50 from sensing layer 30 carries eight electrical channels 56, each channel connecting (and forming a ring surrounding each of) the 16 holes 52 located along one of the eight columns of forcel units 32.

An electrical interface surface 58 of board 50 (adjacent to layer 30) carries an electrically-conductive ring 71 (0.030" in diameter) around each of the 128 holes 52. A wire 60 (located within each hole 52) has its ends soldered to the respective rings at each end of the hole with the solder 70 forming a protrusion 72 above the surface of each ring.

Board 50 and layer 30 are held together by means of a brass flange 73 which mates with a setback perimeter portion of layer 30 and is held by stitching 75 to board 50. Each protrusion 72 makes electrical contact with the corresponding end 36 of each forcel unit 32 so that the channels 56 effectively connect the ends 36 (and hence the forcel units 32) into eight columns each containing 16 forcel units.

Referring to FIG. 6, side 54 also carries eight terminal pads 74, seven of which are connected by short conductive runs to seven rings 76 respectively surrounding seven holes 78 (FIG. 4) through board 50. Each hole 78 holds a wire soldered on one end to ring 76 and, referring to FIG. 5, on the other end to a ring 90 carried on side 58 of board 50. One wire 92 (part of cable 20) is soldered to each pad 74.

On side 58, each ring 90 is connected by a conductive run 94 to one of the rings 71 associated with one of the eight columns of holes 52. As a result, each of the pads 74 on side 54 (and hence each wire 92) is electrically connected to one channel 56 (and hence to the ends 36 of the forcel units 32 in the column corresponding to that channel).

An eighth pad 79 on side 54 is connected directly to the remaining channel 56 (the one not connected via a run 94 to a ring 90 on front side 58).

On front side 58, in addition to the eight columns each containing 16 holes 72, there are also eight columns of contact pads 100, each column containing 16 contact pads 100 positioned along the same 16 rows as holes 72. All of the eight contact pads 100 in each row are connected together by a run (electrical channel) 102 which in turn connects to one of sixteen terminal pads 104, to each of which is soldered one wire 106 (one of the 24 wires in cable 20). The positions of contact pads 100 correspond to the locations of the ends 37 of the forcel units 32.

Referring again to FIG. 3, each contact pad 100 has an associated wafer diode 110 (0.015"×0.015"×0.008"), one terminal of which is attached by electrically conductive epoxy 112 to pad 100 and the other terminal of which is covered with many tiny gold balls 114 (each formed by bonding the tip of a fine gold wire to the terminal), which together effectively make the surface of that terminal rough. When board 50 and layer 30 are held together with each protrusion 72 contacting the associated end 37, each end 36 also electrically contacts the gold ball surface of corresponding diode 110, forming a contact having a resistance which varies with changing force. Each forcel unit 32 and its associated diode 110 thus forms a deflection-responsive sensor element.

Thus, each wire 106 is connected to a row of contact pads 100 and hence to the ends 37 of the forcel units in that row through an electrical channel 102 and a set of diodes. Each forcel unit has one end 37 connected to one wire 106 and the other end 36 connected to one wire 92. Insulative epoxy layer 80 insulates channels 102 from electrical interface surface 38.

Referring again to FIG. 4, a hard protective cap 119 is epoxied to surface 54 to prevent damage to the channels.

Figure 7:
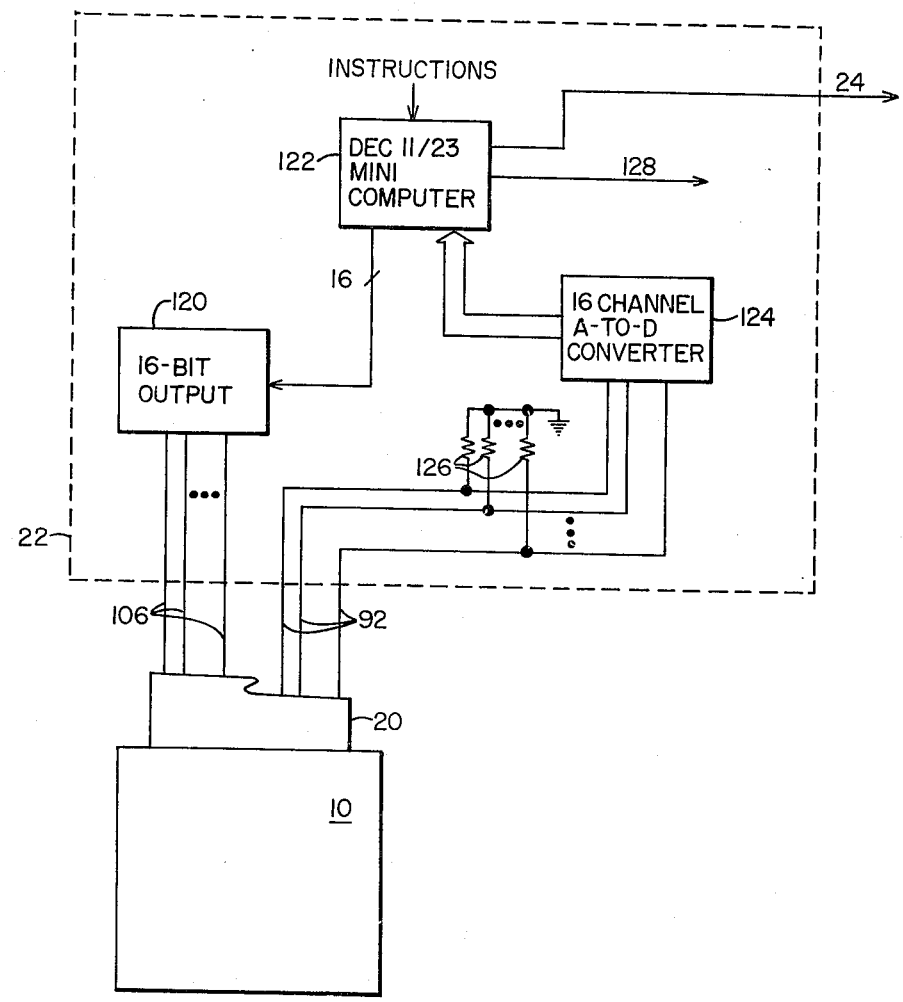
FIG. 7 is a block diagram of electrical circuitry of the tactile sensor system.

Referring to FIG. 7, in analysis circuitry 22, the sixteen wires 106 (called digital wires because they are each driven by a single high-low signal) are connected to a 16-bit output device 120 (model DRV 11 Parallel Line Unit available from Digital Equipment Corporation, Maynard, Mass.) which serves as a digital voltage source to and a means for grounding each of the sixteen wires 106. Output device 120 is driven by computer 122 (model 11/23 MINC available from Digital Equipment Corporation). The eight wires 92 (called analog wires because they provide signals which can vary over a range) are connected through A-to-D converter 124 (model ADV 11 - 16 channel Analog Digital Converter available from Digital Equipment Corporation) to computer 122, each wire 92 being connected to one end of a 6.8K ohm dropping resistor 126, the other end of which is grounded. Computer 122 (comprising data accumulation and data processing means) provides control signals to positioner 13 over line 24 and information indicative of the parameters of object 16 over line 128 (for printing display, analysis or response).

Figure 8:
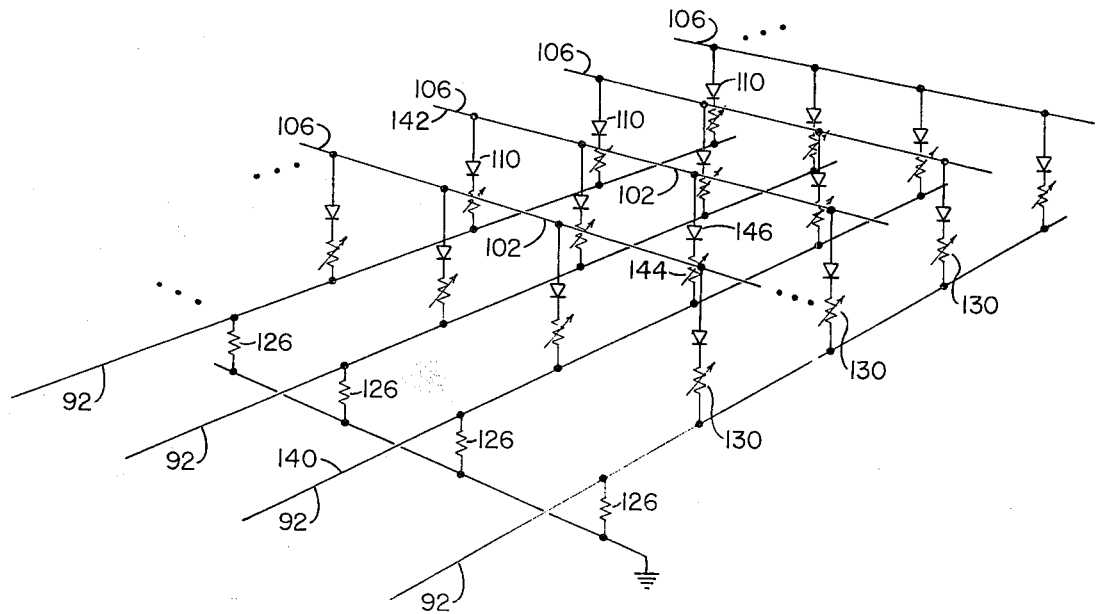
FIG. 8 is a circuit diagram for the sensor elements and printed circuit board.

Each forcel unit 32 (whose resistance changes as layer 30, and hence forcel unit 32, is compressed by a force at sensor surface 14) and the corresponding contacts between end 36 and protrusion 72 and between end 37 and gold ball surface 114 (whose resistances also change with force) is represented in FIG. 8 by a single equivalent variable resistance 130 connected in series with one diode 110. The diodes 110 in each row are connected by channels 102 to digital wires 106 and the other ends of variable resistances 130 are connected in columns by channels 56 to analog wires 92, each of which is connected by dropping resistor 126 to ground.

Manufacture

Figure 9:
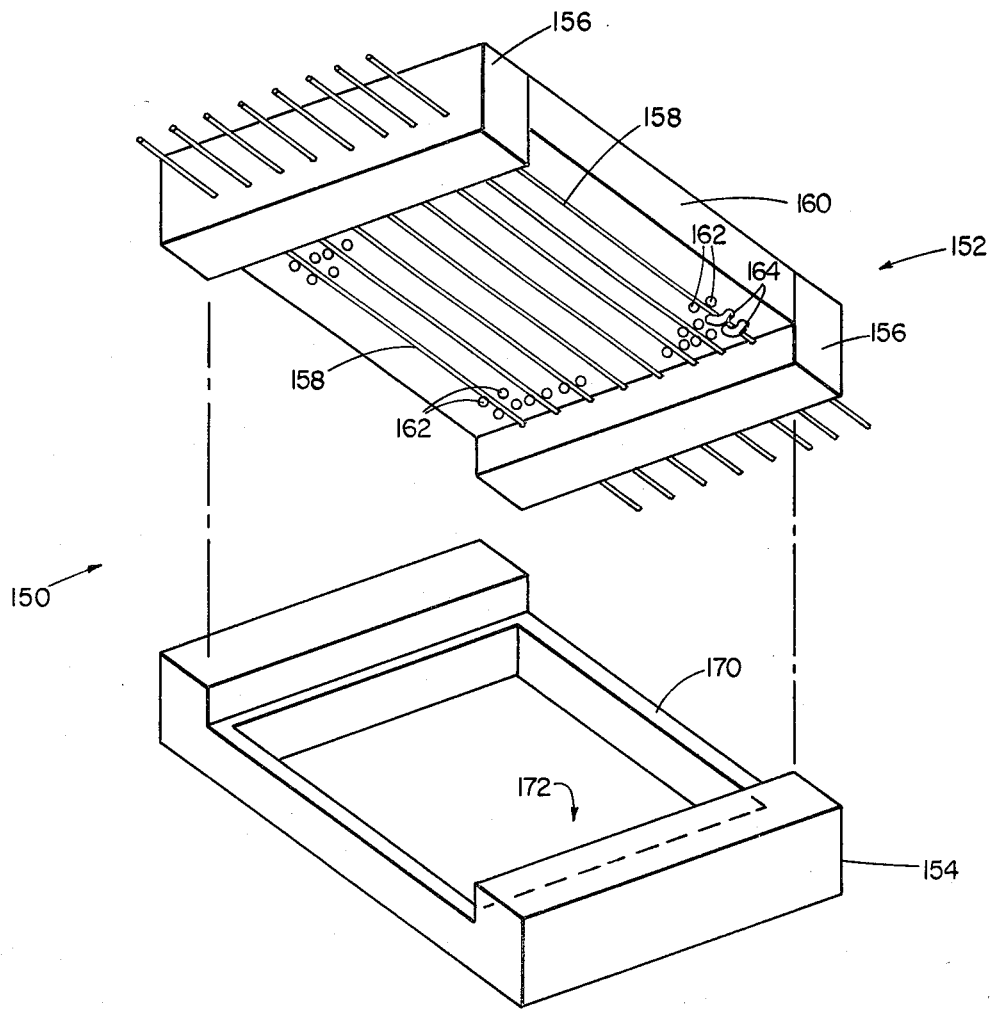
FIG. 9 is an exploded view of a mold for casting the sensing layer.

Referring to FIG. 9, sensing layer 30 is made in a mold 150 having a jig 152 and a base 154. Jig 152 has two aluminum end pieces 156 each having a row of eight 0.020" diameter holes spaced at ⅛" intervals, with eight parallel 0.020" diameter steel wires 158 slidably held in respective pairs of the holes and almost resting on a cord holder 160. Aluminum cord holder 160 has 256 holes 162 (each 0.040" in diameter) arranged in a 16-by-16 grid at intervals of 1/16". Carbon-doped elastomeric cord is stitched through holes 162 and over wires 158 to form a grid of 8 columns and 16 rows of loops 164.

Base 154 (⅛" thick aluminum, 1.4" square) has a recess 170, the bottom surface 172 of which molds the sensor surface 14 of sensing layer 30.

After jig 152 and base 154 are assembled, rubber silicone is poured into the mold, subjected to a vacuum and cured. Once cured, the wires 158 are removed and the resulting holes filled with the matrix material. After removal of the cast matrix (in which loops 164 are embedded) from the mold, electrical interface surface 38 is machined flat. Circuit board 50 is made by conventional techniques, diodes 110 are epoxied to board 50, and the gold ball bonds are applied to the diodes. Insulating epoxy 80 is then painted over surface 58 (but without painting the diode contacts or the solder protrusions which will provide the connections to the forcel units). Wires 92, 106 are soldered to board 50, board 50 and layer 30 are stitched together using flange 73, and protective cap 120 is attached to the exposed face of board 50.

Operation

Referring again to FIGS. 1, 2, positioner 13 acting through arm 12 causes sensor surface 14 to contact, and (because of the resilience of layer 30) to conform to, object 16. This sets up reactive forces which impose a deflection pattern over an array of forcels on surface 14.

While the reactive forces are being imposed, computer 22, under control of an appropriate program, provides to output device 120 a 16-bit word (one bit of which is set to 1 and the other bits of which are zero). Output device 120 causes the one digital line 106 which corresponds to that 1-bit location to be driven to +5 volts DC and causes all other digital lines 106 to be grounded. While the one digital line 106, (and hence the corresponding channel) is at +5 volts, the voltages appearing on each of the 16 analog wires 106 are polled successively by computer 122 from the digital output of 16 channel A-to-D converter 124. The output of the A-to-D converter can represent any one of at least 256 different force levels for a given forcel unit.

The voltage appearing on a given analog wire 92 (e.g., wire 140 on FIG. 8) when a given digital line 106 (e.g., wire 142 on FIG. 8) is powered corresponds only to resistance 144 of the single forcel unit (and related contacts) wired between wires 140, 142. Diode 146 permits the flow of current from wire 142 through resistance 144 to wire 140, but the diodes 110 wired in series with the other forcel units block any flow of current from wire 142 to wire 140 through any other combination of resistances 130. Thus each forcel unit can be electrically sensed completely independently of the other forcel units (i.e., without electrical cross-talk) and the set of signals from all forcel units are representative of the deflection pattern on the sensor surface.

If $R_D$ is the resistance of each dropping resistor 126 and $R_S$ is the variable resistance 144, then the output voltage on line 140 is proportional to $$R_D/(R_D+R_S)$$

and therefore depends, over a continuous range, on the resistance of (and hence the force applied to) the forcel unit which is part of resistance 144.

Although the variable resistances 144 are therefore electrically independent for measurement purposes, they are mechanically linked by elastomeric layer 30 in which they are embedded, so that a force on each forcel unit tends to be transmitted by layer 30 to adjacent forcel units, causing the adjacent units to sense forces which are not directly presented to them. This effect can be reduced, if desired, by empirically and theoretically determined correction algorithms. For example, the current level can be measured for each forcel unit when no force is applied to the sensor and subtracted from the readings obtained when an object is being sensed. Alternatively, a series of readings can be taken at various force levels to derive the current response of each forcel unit with force. The responses of the forcel units are each fit to a curve, e.g., linear, quadratic, or expotential, used to calibrate that forcel unit's readings.

By analyzing the pattern of output signals, computer 122 can determine the size, position, shape or orientation (or other parameters) of object 16, information useful in controlling, e.g., the actions of a robot manipulating arm with respect to the object.

One algorithm for use with the tactile sensor finds the center of a circular hole of known diameter in the object being sensed (e.g., a metal ring), information which would be useful to a robot which must insert something in the hole in the ring.

In a computer displayed image of the deflection pattern of forcels obtained from a 10 by 10 array of forcel units pressed against a metal ring, each forcel is represented by a square area whose brightness relates to the magnitude of the force at the corresponding forcel unit.

The algorithm generates the coordinates of the center of the circular region in the image, based on the assumption that a circular feature of known radius is located somewhere in the image.

The force image is collected by scanning the channels. The position of each forcel unit in the array is specified by its channel row and channel column addresses. Each forcel unit is sampled by holding the digital line corresponding to the row address of the forcel unit high with all other digital lines low, and performing an analog-to-digital conversion on the analog line corresponding to the column address of the forcel unit.

Figure 10:
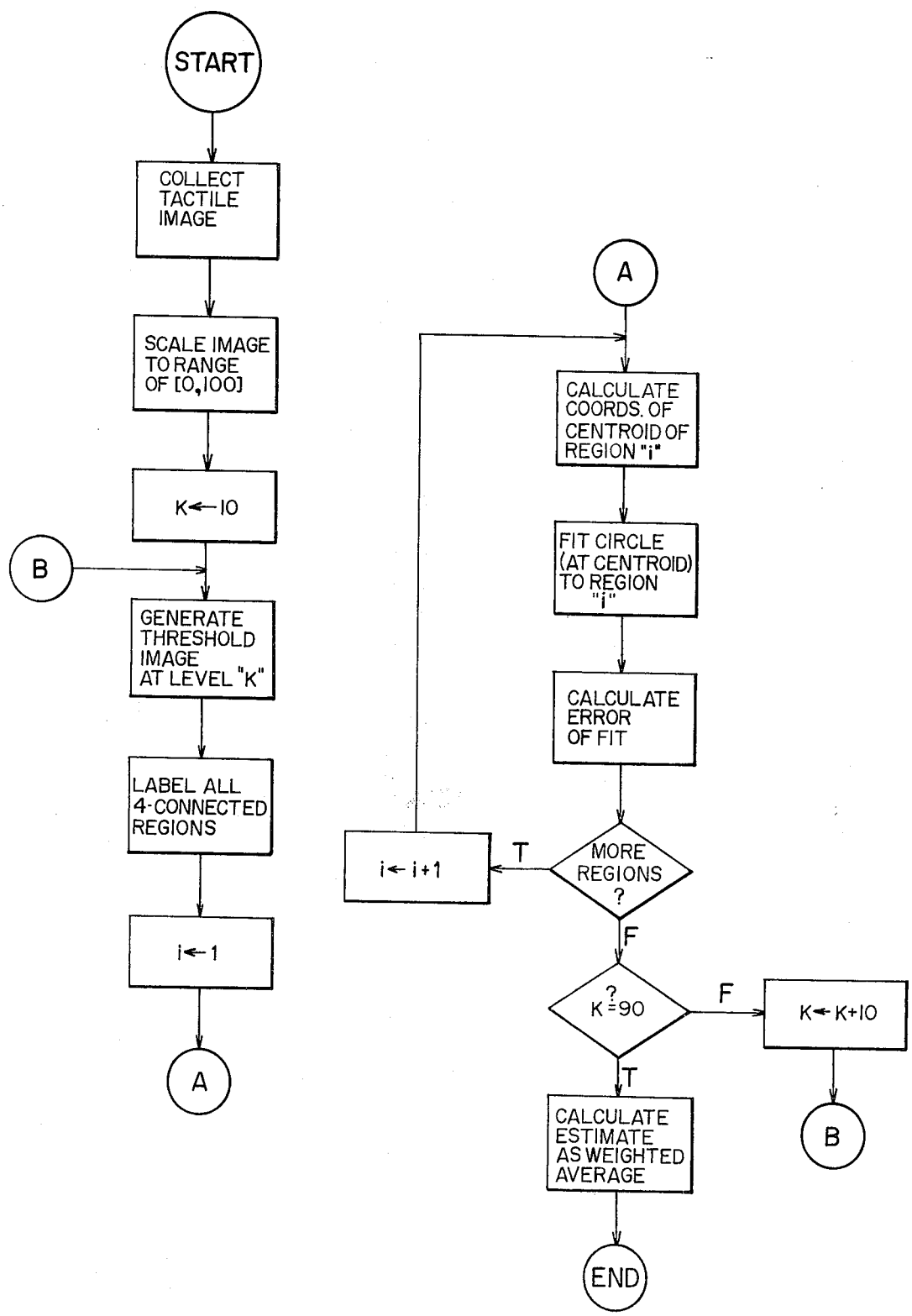
FIG. 10 is a flow chart of a hole-finding algorithm.

Referring to FIG. 10, once collected, offsets are removed by subtracting the values obtained when no force is applied and the tactile force image is scaled so that all of its values fall in the range of zero to 100, making multiple thresholding of the image values easier since a given threshold increment (10 units in this case) always produces the same number of threshold images (nine in this case).

After scaling, the force image is used as the basis for forming nine threshold images. Each binary threshold image comprises an array of square regions, each region having only 1 of two possible states indicating whether or not the value of the corresponding force image forcel value does or does not exceed a specific threshold value for that threshold image. The variable "k" is the threshold value, and it can assume the values 10, 20, ..., 100.

Figure 11:
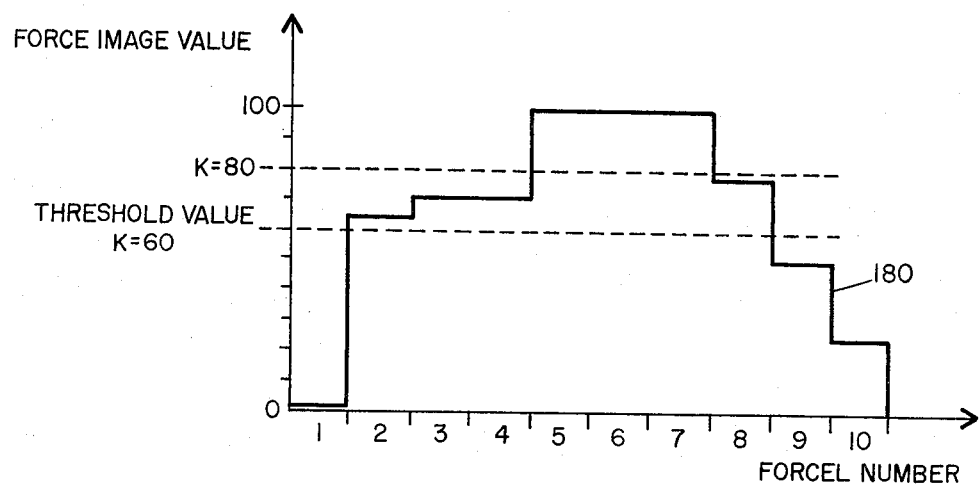
FIG. 11 is a graph illustrating the image thresholding process.

Referring to FIG. 11, for example, the force image values for a set of ten forcels are represented by stepped function 180. In the corresponding threshold image for k=60, the regions associated with forcels 1, 9, and 10 would have one state (indicating that those forcels have values falling below the threshold) and the regions associated with forcels 2 through 8 would have the other state (indicating that those forcels have values exceeding the threshold).

Figure 12:
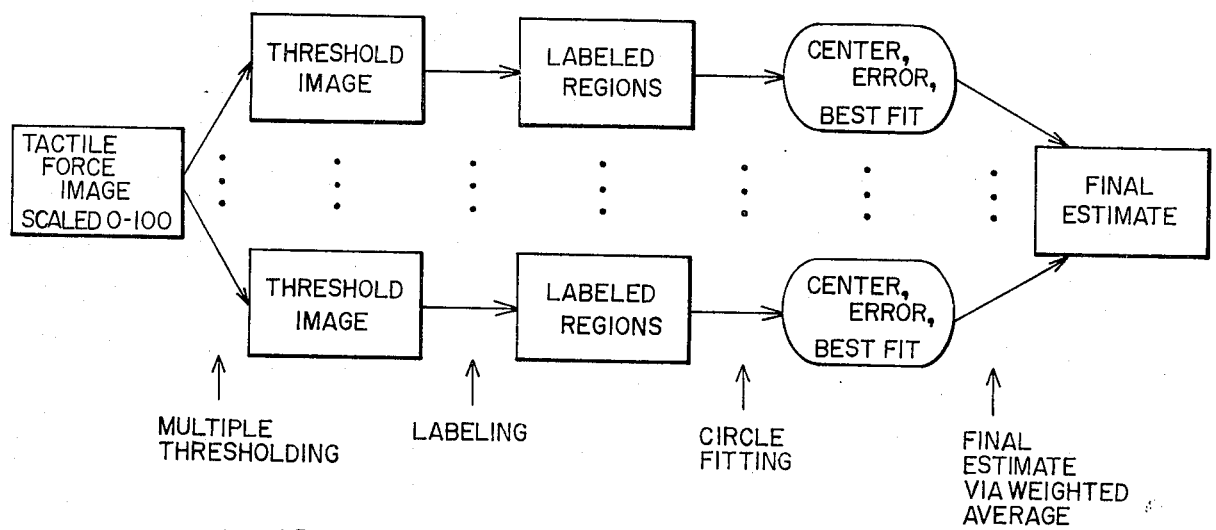
FIG. 12 is a diagram of the hole-finding algorithm.
Figure 13:
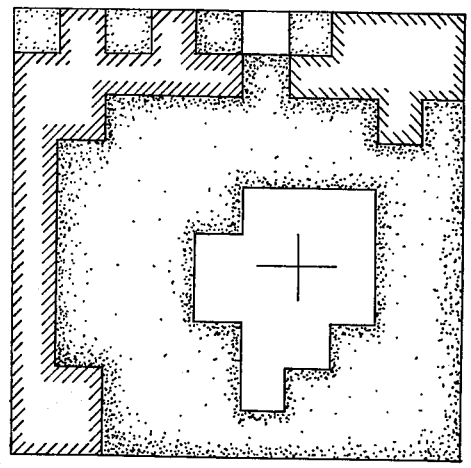
FIG. 13 is a threshold image of an object being sensed.

Referring to FIG. 12, in each binary thresholded image, all so-called 4-connected regions are uniquely labeled. The forcels in a given thresholded image are said to be "4-connected" if they are adjacent either horizontally or vertically and have the same states. Two forcels which are deemed to be 4-connected to the same forcel are 4-connected to one another. In FIG. 13, for example, each 4-connected region has been labeled by giving it a particular brightness level in the image.

Referring again to FIG. 12, for each 4-connected region in each threshold image, the coordinates of the center location are calculated and a circle centered at the center location is fit to the region. A quantity describing the error of fit of the circle to the region is calculated. The center location and error of the best fitting circle for each image are saved and used to represent that image.

Referring again to FIG. 13, the final estimate of the center location (illustrated by the cross-hairs) is produced by calculating the weighted average of the set of "best fits" (one from each threshold level). The coordinates of the circle at a given threshold level are weighted by the error in fit of that circle. The average of these quantities is calculated and then normalized by the sum of the error measures to obtain the final estimate.

The output of the algorithm could be modified to include a quantity indicating the degree of fit of the circle, derived from the fit errors of the individual estimates at the various threshold levels. The algorithm could also be applied at each threshold level to a range of radii, saving the center location, fit error, and radius of the best-fitting circle. The final estimate would include the weighted average of the radii as well as the center locations.

Other Embodiments

Figure 14:
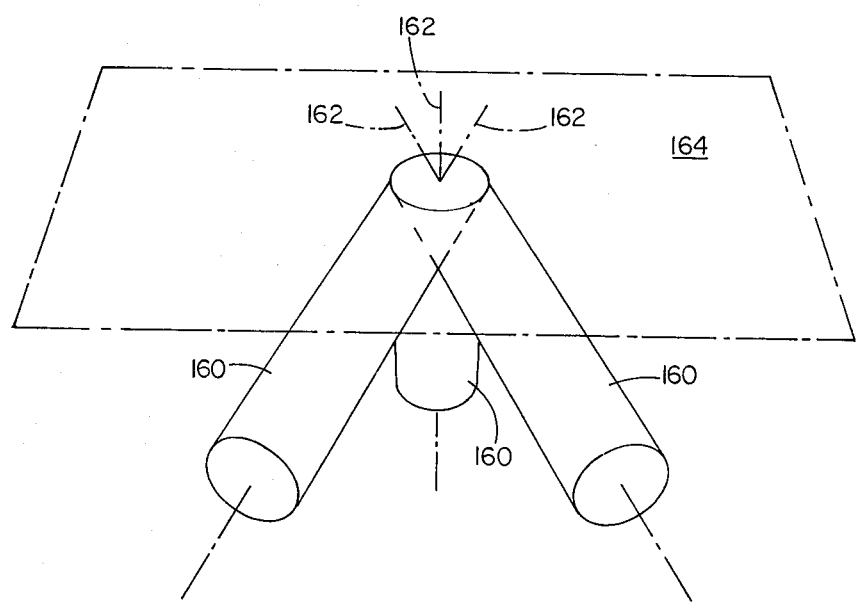
FIG. 14 is an alternative embodiment of a forcel unit.

Referring to FIG. 14, in other embodiments a group of sensor elements 180, each having an axis 182, along which the element's resistance is sensitive to force, is arranged so that the axes intersect at a location on face 164. By comparing the sizes of the voltages across at the various elements 180, not only the size but also the direction of the force at that location can be measured.

Other embodiments are within the following claims.

I claim:

1. In a tactile sensor for an object based on detecting the deflection pattern in a sensor surface caused by contact of the surface with the object, comprising deflection-responsive sensor elements associated with said surface, the elements having electrical paths the characteristics of which are dependent upon the forces applied to said elements, and electrical circuitry connecting said elements to a means for determining a physical parameter of the object being sensed, the improvement wherein:

said sensor elements comprise an array of discrete, elastomeric, electrically conductive, electrically force-sensitive forcel units electrically insulated from one another, each forcel unit defining a local force-resolution region (forcel) for the resolution of the deflection pattern in said surface, and said circuitry comprises a plurality of electrical channels, each sensor element being connected between a pair of the channels, said channels being adapted to be electrically sensed to produce a set of signals representative of said deflection pattern in said surface.

2. The tactile sensor of claim 1 wherein each forcel unit comprises a pair of electrical connecting portions and an intermediate body portion extending between said connecting portions and positioned with respect to said sensor surface to be deflected by said object, the electrical path of said forcel unit extending from one of said connecting portions through said intermediate body portion to the other said connecting portion.

3. The tactile sensor of claim 2 wherein
each forcel unit comprises an elongated segment the ends of which comprise the pair of connecting portions, and
the segment is bent with the ends disposed along a common electrical interface surface, and with an intermediate part of the segment disposed toward the sensor surface.

4. The tactile sensor of claim 2 wherein the segment is a u-shaped cord.

5. The tactile sensor of claim 3 further comprising a circuit board having a contact surface carrying said channels, said channels being exposed for making electrical contact, and wherein said contact surface is disposed against said interface surface with said ends contacting said channels.

6. The tactile sensor of claim 1 wherein
each channel is connected to more than one forcel unit, and
said circuitry includes unidirectional current flow means for limiting the direction of flow of current in said circuitry to enable discrimination between different forcel units.

7. The tactile sensor of claim 6 wherein
said unidirectional current flow means comprises individual diode-like elements each electrically connected between one forcel unit and one channel,
said diode-like elements preventing multiple electrical paths from contributing to a given said signal, whereby the deflection of each forcel unit may be individually sensed without electrical cross-talk from simultaneously deflected adjacent forcel units.

8. The tactile sensor of claim 1 wherein
the channels are arranged in columns and rows for resolving the sensor surface into a grid of said forcel units, and
the channels are adapted for sequentially reading current flowing through individual columns and rows.

9. The tactile sensor of claim 8 further comprising
a voltage source for powering a succession of individual columns, and
means for grounding at least some of the columns other than the column which is powered,
and wherein said circuitry further comprises means for sensing a succession of individual rows while each column is powered, to produce a set of said signals each indicative of the deflection of one of the forcel units.

10. The tactile sensor of claim 1 wherein each forcel unit is mechanically coupled with at least one other forcel unit, whereby a force imposed on one forcel unit produces a deflection in the other forcel unit.

11. The tactile sensor of claim 10 wherein said forcel units are embedded in an elastomeric, insulative supportive matrix substance.

12. The tactile sensor of claim 1 wherein there are groups of said forcel units each group associated with one of the local force resolution regions, the relative levels of said signals between forcel units in each group being indicative of both the direction and the magnitude of the force at the associated local force-resolution region.

13. The tactile sensor of claim 1 wherein the characteristics of the electrical paths vary proportionally with the forces at the local force-resolution regions.

14. The tactile sensor of claim 1 wherein one said characteristic of each electrical path is resistance, and each forcel unit comprises a carbon-doped elastomer.

15. A sensing system for determining a physical parameter of an object based on contacting the object being sensed, comprising
a tactile sensor comprising
a sensor surface, arranged for contact with and deflection by said object,
means for producing sets of signals representative of the pattern of said deflection at an array of force-resolution regions (forcels) of said surface, and
an array of discrete, elastomeric, electrically conductive, electrically force-sensitive forcel units electrically insulated from each other, each forcel unit being associated with a forcel,
a positioner for causing contact between said object and said sensor surface, and
analysis circuitry for determining said physical parameter based on said signals, comprising
data accumulation means for deriving and storing said sets of signals from said tactile sensor, and
data processing means for manipulating said stored signals in accordance with a predetermined program of steps and generating information indicative of said parameter.

16. The system of claim 15 wherein said object comprises a workpiece, and said positioner comprises a manipulandum of a robot.

17. The system of claim 15 wherein said parameter is the shape of said object.

18. The system of claim 15 wherein said parameter is the size of said object.

19. The system of claim 15 wherein said parameter is the location of said object.

20. The system of claim 15 wherein said parameter is the direction in which said contact is made.

* * * * *

UNITED STATES PATENT AND TRADEMARK OFFICE
CERTIFICATE OF CORRECTION

PATENT NO. : 4,481,815
DATED : November 13, 1984
INVENTOR(S) : Kenneth J. Overton It is certified that error appears in the above-identified patent and that said Letters Patent are hereby corrected as shown below:

Col. 2, line 18, "carbon doped elastomer" should be
--carbon-doped elastomer--;

Col. 6, line 28, "22" should be --122--.

Signed and Sealed this

Seventh Day of May 1985

[SEAL]

Attest:

DONALD J. QUIGG

Attesting Officer     Acting Commissioner of Patents and Trademarks